3,036,126
DIBASIC ACID TREATING PROCESS
Harry Chafetz, Poughkeepsie, N.Y., assignor to Texaco Inc., a corporation of Delaware
No Drawing. Filed Dec. 24, 1957, Ser. No. 704,891
4 Claims. (Cl. 260—537)

The instant invention relates to the separation and purification of mixtures containing succinic anhydride and/or succinic acid and at least one higher dibasic acid of the oxalic acid series.

Other acids of this homologous series are pimelic, suberic, azelaic, sebacic, and higher ones of the formula $(CH_2)_n(COOH)_2$ where $n$ is an integer having a value of at least 3. These dibasic acids are useful for making plasticizers, synthetic lubricants, and the like. Particularly commercially important is adipic used in the manufacture of nylon 66.

Most dibasic acid processes producing a mixture of succinic, glutaric, and adipic acids produce actually a complex crude mixture containing, in addition to a fairly wide spectrum of the above-mentioned high molecular weight dibasic acids, also a variety of contaminants such as monobasic acids, particularly $C_{1-10}$ monobasic acids and associated contaminants having non-carboxylic oxygen. These are generally objectionable because they give the crude a bad odor and a dark color and are difficult to remove cheaply by conventional methods. Typical kinds of such associated contaminants are alcohols, esters, ketones, lactones, nitrated hydrocarbons, tars, aldo acids, keto acids, and hydroxy acids.

A crude mixture of succinic, glutaric, and adipic acids and significant quantities of the higher dibasic acids of the oxalic acid series (in most instances) can be made in a number of ways, for example, by oxidation of paraffinic and/or isoparaffinic hydrocarbons, e.g., refined wax, semi-refined wax, petrolatum, lubricating oil, slack wax, scale wax, foots-oil and the like, with air, hydrogen peroxide, nitric acid, chromic acid, ozone, or a mixture or a succession of these oxidizing agents. The preferred crude mixture is made by two-stage process wherein a macrocrystalline paraffin wax is oxidized with air, usually in the presence of a metalliferous oxidation catalyst such as a manganese salt, until the Saponification Number of the mixture reaches at least 200 and, advantageously, 300 and 600; thereafter the air oxidate is agitated intensively with nitric acid at a temperature between 180° and 450° F. for at least about one minute.

Alternatively, the wax can be oxidized in a single stage with air or other oxygen-containing gas, and the bulk of the dibasic acids extracted from the oxidate with water, or a lower molecular weight (e.g., $C_1$—$C_3$) alkanol, or an aqueous solution of mineral acid such as hydrochloric, sulfuric, or the like (and subjected to acid hydrolysis to break up esters, if desired). Metal salts can be removed from the aqueous extract solution as hereinafter described, and the water or other solvent removed to leave a dark-colored residue of crude dibasic acids suitable for treatment by my process.

Other ways of making similar crude mixtures containing succinic and higher dibasic acids of the oxalic acid series are: oxidation of levulinic acid with molecular oxygen in the presence of metalliferous oxidation catalyst; oxidation of hydroxy acids such as hydroxy stearic acid or glycerides thereof with nitric acid; oxidation of unsaturated fatty acids such as oleic acid, cotton seed fatty acid, or linseed fatty acid or their corresponding glycerides with nitric acid; oxidation of Fisher-Tropsch and oxo products, e.g., with nitric acid; and nitric acid oxidation of cycloparaffins such as cyclopentane, cycloalkanols such as cyclohexanol, and cycloketones such as cyclohexanone.

Heretofore it has been proposed to use fractional crystallization from solvents for separating and purifying various dibasic acids in crude mixtures, and treatment of the crystalline material with activated charcoal or similar adsorbents for purifying the products. It has also been proposed to separate these complex mixtures into concentrates preponderating in specific dibasic acids by column partition chromatography wherein, for example, the mixed acids in aqueous solution are placed on a column of moist silica gel and washed through with chloroform-butanol mixtures containing increasing proportions of the alcohol, the acids being eluted in reverse order of their molecular weight. The cost of chromatography, of course, is such as to render it prohibitive except as an analytical procedure. Advantages of my process over prior art techniques include economy, simplicity, and outstanding effectiveness.

My process is broadly a three-stage one. In the first stage I employ a substantially exhaustive distilling operation to separate a compound selected from the group consisting of succinic anhydride, succinic acid, or a mixture of same selectively from the higher dibasic acid material. In the second stage I crystallize out residual dibasic acids from the distillation residue. In the third stage I use an extractive contacting of said residual crystalline dibasic acids with liquid sulfur dioxide whereby oxygenated impurities are removed. Using a broad-spectrum source of dibasic acids such as those from air and nitric acid oxidation of wax the sulfur dioxide-insoluble fraction is a free-flowing remainder of crystalline glutaric, adipic and higher dibasic acids.

More specifically, my process comprises forming a distilland of a mixture comprising succinic anhydride and higher dibasic acids of the oxalic acid series and an inert hydrophobic organic solvent, said solvent having atmospheric boiling point of at least about 175° C., substantially completely exhausting said distilland of succinic anhydride by vaporizing a fraction of said distilland at a temperature of about 175-225° C., thereby forming a distillate comprising said solvent and succinic anhydride, condensing at least a major portion of the solvent and said succinic anhydride comprising said distillate, cooling the condensate to temperature below about 150° F., separating the resulting solid phase of succinic anhydride from condensed solvent, and returning condensed liquid solvent to said distilland; crystallizing out and separating crystalline remaining dibasic acids from the distillation residue; lixiviating said separated crystalline dibasic acids with liquid phase sulfur dioxide, and thereafter separating the resulting lixivium containing oxygenated impurities from the remaining purified solid dibasic acid fraction. The distilling step is more fully described in my copending U.S. patent application entitled "Succinic Acid and Anhydride Separation Process," having Serial No. 704,943, filed simultaneously herewith.

A more restricted aspect of my process is one wherein succinic anhydride and succinic acid are co-distilled simultaneously from the distilland. Thus, in this aspect of my invention separation of succinic acid or admixture of succinic acid and succinic anhydride from a mixture thereof with higher homologous dibasic acids, e.g., those of the oxalic acid series commencing with glutaric, involves forming the same kind of distilland as described above, vaporizing a portion of said distilland at a temperature of about 175–220° C., thereby forming a distillate comprising said solvent, succinic anhydride, succinic acid, and water, and condensing at least the major portion of the solvent and said anhydride and acid comprising said distillate, cooling the condensate to a temperature below about 150° F., separating the resulting solid phase succinic anhydride and succinic acid from the condensed liquid solvent, returning the condensed solvent to said distilland, and continuing the foregoing operations until said distillate is substantially depleted of original succinic acid content or original succinic acid and succinic anhydride content (should some anhydride be present with the acid initially).

It will be understood, however, that the product of this second aspect of my invention will constitute predominantly (actually preponderantly in most cases), succinic anhydride—even though no succinic anhydride is present in the initial distilland. Under the conditions of operation, succinic acid dehydrates to a large extent and the by-product water is separated from the condensed hydrophobic solvent. As described hereinafter, the separation of water can take place by partial condensation of the distillate or by total condensation thereof with separation of the hydrophobic solvent as a distinct liquid phase from water condensate.

In still another restricted aspect of my invention the succinic acid, or succinic acid and succinic anhydride admixture, present with the higher homologous dibasic acids of the oxalic acid series is formed into a distilland as before. In this case, however, the distillation is first performed from the distilland under rectifying conditions with a refluxing distilling column, packed tower, tray tower, or the like whereby the solvent and water are formed substantially exclusively into the overhead distillate fraction, while the higher boiling succinic and other dibasic acids and succinic anhydride remain as a bottom fraction.

When the evolution of water from the distilland substantially ceases, as can be determined conveniently in a batch operation by totally condensing the solvent-water distillate, separating and refluxing the hydrophobic solvent to the distilling column, and measuring the gradually diminishing rate of increase of separated water from the condensed distillate, the succinic acid originally present in the distilland has been practically entirely converted into succinic anhydride. Superatmospheric pressure here helps suppress anhydride volatility.

At this stage codistillation of the succinic anhydride and solvent from the distilland is begun, this phase of the distillation being done without rectification so as to form a distillate of solvent and succinic anhydride. Condensing a major portion of the solvent and the distilled anhydride, then cooling the condensate to a temperature below about 150° F. permits separation of the resulting solid phase succinic anhydride from the condensed solvent, and the condensed solvent is returned to the distilland for continuing the co-distillation of the anhydride and solvent until the distilland is substantially depleted of its original succinic acid, or succinic acid and succinic anhydride, content.

By an inert, high-boiling hydrophobic organic solvent for this process I mean an organic liquid (at ordinary temperatures) capable of dissolving succinic acid and succinic anhydride to form a solution of at least about 5 grams of succinic acid and/or succinic acid and its anhydride per hundred grams of said solvent at temperature of 175–220° C., and exhibiting no substantial chemical change under process conditions. The suitable solvent (or solvent mixture) also must have an atmospheric boiling point of at least about 175° C., and advantageously of about 175–220° C. (for atmospheric pressure operation). It is to be understood, however, that reduced pressure can be used in the operation so as to maintain the distilland temperature between about 175° C. and about 220° C. whereby effective dehydration of succinic acid and codistillation of succinic acid or succinic anhydride and succinic acid mixture can take place selectively from the other components in the distilland without deleterious effects either to the distilland or to the distillate.

Hydrophobic character of the solvent is necessary to secure rejection of water from the solvent and is a fairly common characteristic of inert organic solvents having a boiling point as high as those concerned here. Suitably, the solvent will not dissolve as much as a gram of water per hundred grams of solvent at atmospheric temperature and pressure, i.e., one atmosphere total pressure and 70° F. Thus, a wide variety of organic solvents are available for my process because the important properties of the solvent are its inertness, its immiscibility with water at ordinary temperature, its high boiling point, and its ability to dissolve at least a small amount of succinic acid and succinic anhydride at elevated temperature and to follow the normal characteristic of solvents with temperature, that of having considerably less solubility for the solute as the temperature falls. At the lower temperatures (150° F. and below) the preferred types of solvent dissolve substantially less than 5 grams of solute per hundred grams of the solvent.

Inertness of the solvent is an important consideration in the practice of my invention. The solvent should not be an amine or an alcohol (which would react with the dibasic acid mixture) or an ester (which could lead to transesterification). Solvents having aromatic nuclear structure appear to be specially suitable for the general practice of my process. The most suitable and so preferred specific inert solvents for the practice of my process are halohydrocarbons such as one or a mixture of chlorobenzenes, chlorotoluenes, chloroethylbenzenes, and chloroethyltoluenes; ethers such as cresyl methyl ethers, cresyl ethyl ethers, and cresyl benzyl ethers; and hydrocarbons such as one or a mixture of diethylbenzenes, butylbenzene, amylbenzene, and tetralin. Other types of solvents which are satisfactory are monobasic acids e.g., valeric acid, diethylacetic acid, caproic acid, (although their odor makes them less desirable than the foregoing solvents). I can also use aliphatic or aromatic nitriles such as benzonitrile, caprylic acid nitrile, tolunitriles. Aliphatic and aromatic nitrohydrocarbons are also suitable, e.g., nitrobenzene, nitropentane, and the like.

If the solvent has a boiling point substantially below 175° C., I have found that my process cannot be operated at atmospheric pressure to cause co-distillation of the succinic anyhdride, or the succinic anhydride and acid, in any practical fraction relative to the solvent. To increase the pressure of the distillation and thereby raise the boiling temperature of the solvent would, of course, further suppress vaporization of any appreciable mol fraction of the high-boiling succinic material into the vapor phase.

To operate with a distilland boiling substantially above about 220° C. tends to cause degradation and/or decarboxylation of the succinic anhydride to an undesirable degree. Thus, for the preferred atmospheric pressure operation, the normal boiling point of the solvent should be about 175° C. and about 220° C. and is even more preferably between about 180° and about 200° C. Solvents having higher boiling points can, however, be used with reduced pressure operation to maintain boiling point of the distilland within the 175–220° C. range. However, for efficiency and economy in the operation, use of solvents having boiling points substantially above 250° C. necessitate undesirably low pressures.

Surprisingly, I am able to separate selectively succinic anhydride, or succinic acid and anhydride, from mixtures with higher homologous dibasic acids including glutaric acid. The glutaric acid, which also is capable of forming a cyclic anhydride, does not collect in the separator, but instead a good grade or a mixture of succinic anhydride and succinic acid or simply succinic anhydride collects there (depending on the distilling procedure).

The preferred source of crude dibasic acid mixture in the practice of my invention is one containing in the main, as dibasic acids, succinic, glutaric and adipic acid from the air and nitric acid oxidation of macrocrystalline paraffin wax, described hereinbefore. In such process an aqueous phase containing practically all the dibasic acids separates by gravity from an oily phase after the nitric acid oxidation step. Weight proportions of specific dibasic acids in this aqueous layer is approximately as follows: 20 to 35% succinic ($C_4$); 15 to 25% glutaric ($C_5$); 15 to 25% adipic ($C_6$); 5 to 15% pimelic ($C_7$); and 5 to 25% suberic ($C_8$) and higher.

This aqueous phase is preferably treated with a cation exchanger to remove some of the metal content which would otherwise remain in the distilland. Useful cation exchangers are insoluble substances having sulfonic acid groups. They can be prepared from a natural product such as coal by reacting with a sulfonating agent, e.g., sulfuric acid, sulfur trioxide, or chlorosulfonic acid. They can also be made from phenol-formaldehyde resins which have been sulfonated in the ring or which contain omega sulfonic groups introduced with reaction of formaldehyde and a sulfite. Also suitable are resins prepared by sulfonating copolymers of styrene and polyvinylbenzene. If the cation exchangers are purchased in a salt form, they can be readily converted into their hydrogen form for the metal salt removal by treating them with a dilute solution of a mineral acid such as hydrochloric or sulfuric acid.

Suitable cation exchange resins for removal of metal in the foregoing aqueous dibasic acid solution include Amberlite IR-120 (the trade name for a high density, strongly, acidic nuclear sulfonic acid cation exchange resin made by the Rohm and Haas Company) or Dowex 50 (the trade name of a similar strongly acidic cation exchange resin made by the Dow Chemical Company).

Substantially all the water and nitric acid are removed from said aqueous layer containing dibasic acids by distillation, preferably at reduced pressure of about 300 mm. Hg absolute. This also removes lower molecular weight monobasic acids and leaves a dark-colored residuum (frequently oily at room temperature) of crude dibasic acids. The dark-colored undistilled residuum is then mixed with the high boiling inert hydrophobic organic solvent, preferably 1 to 7 parts per part of said solvent is sufficient to dissolve the entire residue.

Should undissolved components remain, they will tend to impart uneven boiling and bumping to the distilland in my process but are otherwise innocuous. Use of a smaller proportion of inert organic solvent than about one part per part of crude dibasic acid residuum can give rise to an undesirably high boiling point in the distilland and/or too little solvent in the "codistillate" to insure keeping the condensate cooler flushed clean. Use of even larger proportions of solvent above about 7 adds to the cost of the process without signficant advantage. In the initial stages of the operation, before or even during the distillation, it is advantageous to use mechanical agitation of the distilland to prevent overheating thereof.

Because of the high boiling solvent used I can operate to dephlegmate, that is, to partially condense the "codistillate" comprising succinic anhydride, water, and inert organic solvent, so as to keep water in the vapor phase, above 212° F. at atmospheric pressure, while condensing a larger part or usually virtually all of the organic solvent and succinic anhydride and succinic acid. In this instance the water vapor is vented away and the condensate of succinic anhydride, succinic acid, and solvent is further cooled in a subsequent operation to a temperature below about 150° F. The solvent and crystalline anhydride and acid are separated by gravity from each other and the solvent recycled to the distilland. Condensing solvent keeps the solid phase anhydride mobile, e.g., by a washing action. The comparatively low solubility of the anhydride and acid in the organic solvent at temperatures below about 150° F. makes the separation of the anhydride and acid from condensed solvent quite simple by gravity means.

In the preferred operation, however, the distillate is totally condensed and cooled to temperature between about 60° and about 145° F., but not so low as to solidify the solvent. In such case, a solvent layer separates by gravity from the water of the condensate. The solvent layer is directed back to the distilland and any discrete liquid water removed continuously or intermittently from a separating vessel. Solid phase succinic anhydride and acid collects in a conventional separating vessel wherein it can be removed periodically or continuously. In a codistillation of water, solvent, and succinic anhydride some of the succinic acid in the condensate may be the result of rehydration of the anhydride in the separating vessel.

When the succinic acid is substantially completely exhausted from the distilland (as evinced, for example, by no further separation of crystals from the cooled overhead condensate), I crystallize out remaining dibasic acids in this distillation residue, ordinarily by a simple cooling to about room temperature or below, e.g., to a temperature from minus 20 to plus 100° F. When very impure dibasic acids have been used, a dark, sometimes gummy and sometimes oily, material insoluble in the distillation solvent frequently forms. This material, which contains most of the mineral matter originally present can be separated from the distilland by either filtration or decantation at a temperature slightly below the boiling point of the solvent.

Higher and lower temperatures can also be used for this crystallization so long as the solvent fraction remains liquid. Frequently it is advantageous in such instance to strip away a little solvent for concentrating the distillation residue containing the dibasic acids. This can be done by conventional distillation, azeotropic distillation with the injection, for example, of steam or water, vacuum distillation, and/or a stripping distillation with an entraining permanent gas such as nitrogen. In such case temperature of the concentrated distilland should not be permitted to go above about 220° C. to guard against substantial decarboxylation or other degradation of the dibasic acids in the stripped residue.

When using crude dibasic acid mixture from the preferred source and 1 to 3 parts of inert hydrophobic organic solvent per part of initial present crude dibasic acid mixture, a concentration distillation is unnecessary. Simple cooling to about 80° F. precipitates the major part of the dibasic acids remaining and they can be filtered off, then washed, for example, with chloroform or a light hydrocarbon such as mixed hexanes, petroleum ether or the like to remove the preceding high boiling organic solvent traces. In some instances it is advantageous to run a concentrating distillation on the first filtrate for recovery of a further crop of mixed crystalline dibasic acids; obviously, such crystal cropping operation can be repeated one or more times. Additionally, particularly when operating on a distillation residue from the preferred crude dibasic acid source, correlation of solvent proportion and crystallizing temperature, e.g., concentration to about 40% solids and cooling to about 150° F., can be used to effect partially selective crystallization (i.e., a type of fractional crystallization), e.g., of a predominantly adipic acid crystal crop containing practically no dibasic acids of higher molecular weight than adipic using said preferred stock.

The contacting of the precipitated mixture of remaining dibasic acids with liquid sulfur dioxide can be done in a single treatment, a series of treatments, or a continuous operation such as a continuous countercurrent extraction similar to that employed, for example, in the purification of precipitated chalk and the like. Ordinarily the weight ratio of liquid sulfur dioxide to total mixture containing the subject dibasic acids will be between about 1:1 and about 10:1, but more or less $SO_2$ can be used depending upon the proportion of impurities present and the degree of product (dibasic acid) purity desired.

When working on the crystalline residue mixture from the preferred source, I find that a single treatment of this residue with at least about two times its weight of liquid sulfur dioxide is adequate for producing a free-flowing, crystalline $C_{5+}$ dibasic acid fraction. However, in larger scale operation, a series of lixiviations or extractions with smaller portions of liquid $SO_2$ aggregating 1–10 times the weight of the residue can be used with advantage.

Suitable materials of construction for my process are corrosion resistant, e.g., glass, glass-lined steel, an austenitic stainless steel or the like. In the sulfur dioxide contacting mechanical agitation is preferred. The extract fraction is essentially separated from the insoluble fraction of purified $C_{5+}$ dibasic acids by filtration, decanting, or centrifuging. The remaining insoluble $C_{5+}$ dibasic acids can be rinsed with a small amount of additional liquid sulfur dioxide to remove occluded liquors. Retained $SO_2$ can be removed most simply from the insoluble remainder by simply allowing it to warm at room temperature at atmospheric pressure. There results a mass of free-flowing, crystalline $C_{5+}$ dibasic acids—predominantly adipic acid. These can be further fractionated by conventional methods, e.g., by recrystallizing from solvents such as water, ortho dichlorobenzene, acetone, ethyl acetate or the like, if desired.

I have found additionally, particularly when using very impure mixed dibasic acids for a charge stock to my process, e.g., from wax oxidation with air or nitric acid or from natural oil oxidation with nitric acid, and subjecting such mixture to the initial high temperature distillation, that small amounts of highly insoluble dark-colored impurities freqently occur, even in the purified, free-flowing crystalline $C_{5+}$ product from $SO_2$ lixiviation. Such impurities can be removed with ease from the lixiviated product to give a white crystalline product by dissolving the $SO_2$-lixiviated material in a common light solvent such as water, acetone, ethyl acetate or the like, preferably water for economy and effectiveness, filtering off the insoluble impurities, then separating the $C_{5+}$ acids from the filtrate, e.g., by driving off the solvent or crystallizing the acids therefrom. It is possible, also to so operate on the crude crystalline dibasic acids precipitated from the distillation residue before its $SO_2$ lixiviation, then employ the $SO_2$ lixiviation on the solid acids recovered from the filtrate, to obtain substantially the same purifying effect.

The following examples show ways in which my invention has been practiced but should not be construed as limiting the invention. All parts indicated are parts by weight, and percentages are weight percentages unless otherwise noted. Pressure for the initial distillation operation was, in all cases, atmospheric but it should be understood that lower pressures can be used providing that the boiling temperature between about 175° and 220° C. is maintained in the distilland for effective entrainment of the succinic acid and succinic anhydride without substantial degradation of the dibasic acid present.

*Example 1.*—The mixture of crude dibasic acids used were prepared by the further nitric acid oxidation of a previously air-oxidized petroleum wax having a saponification No. of 504, the air oxidation being conducted in the presence of manganese catalyst. 8.02 parts of 10.6% nitric acid was used per part of air-oxidized wax oxidate in the further oxidation which was conducted at a temperature of 305–355° F. The crude dibasic acids were isolated from the aqueous phase of the reaction product by stripping off the water, unreacted nitric acid, and low boiling compounds at a pressure below 300 mm. Hg absolute. Proportions of specific dibasic acids in the brownish, somewhat oily, crystalline residue were: 27% succinic; 18% glutaric; 13% adipic; 8% pimelic, and 11% suberic and higher. There was also 4% water and 9% impurities in said residue, and it had a Neutralization Number of 720.

These very crude dibasic acids were dissolved in water and passed through a column of the hydrogen form of Amberlite IR-120 cation exchange resin to remove metallic impurities. A mixture of crude, yellowish, crystalline dibasic acids was recovered from the ion-exchanged effluent by a stripping distillation at atmospheric pressure to a temperature of about 195° F. Proportions of specific dibasic acids in the mixture were: 33% succinic; 19% glutaric; 15% adipic; 9% pimelic; and 11% suberic and higher. There were also 13% impurities. Neut. No. of the stripped residue was 770.

A distilland mixture was made by mixing 50 grams of the crude, ion-exchanged, stripped acid residue and 200 ml. of a technical grade of ortho dichlorobenzene (85% ortho). The distillation equipment was a flask equipped with a stirrer, a dropping funnel, and a distilling head with condenser. Rectification between the flask and the distilling head was only incidental. The mixture was distilled with the distillate being collected in 100 ml. portions, cooled to about 65° F., separated from any discrete water present, and filtered to remove solids. Thus treated, the distillate was recycled to the distillation flask at a rate adjusted so that the volume of the distilland was never less than about 100 ml., the temperature of the distilland being maintained between 180° C. and 185° C. Solids filtered from the distillate weighed 12.7 grams, these solids being a mixture of succinic anhydride and succinic acid equivalent to about 14.3 grams of succinic acid (which represents about 87% of the succinic acid originally present in the sample of the dibasic acids subjected to the foregoing codistillation treatment).

A dark distillation residue remained. It was cooled to room temperature and filtered to separate some very dark colored solids. These solids were extracted three times with 62-gram portions of refluxing sulfur dioxide at a temperature of approximately −10° C. The $SO_2$-insoluble material was a greyish powder. This powder was dissolved in water, filtered of a small amount of dark, insoluble material, and the filtrate stripped to dryness, thereby leaving a mass of free-flowing, white, crystalline solids having a neut. No. of 757 and analyzing: no succinic acid or succinic anhydride; 30.4% glutaric acid; 41.1% adipic acid; 4.5% pimelic acid; 11.6% suberic and higher acids; 12% unidentified acids.

*Example 2.*—The mixture of crude dibasic acids used here was the same kind as that used in Example 1. A portion, 50 grams, of these recovered, ion-exchanged acids was mixed with 200 ml. of ortho dichlorobenzene, and the mixture subjected to distillation treatment in a flask connected to a fractionating column equipped with a condenser and receiver. A total of 75 ml. of distillate was collected, the distillate temperature range being 77° to 166° C. and the distilland temperature range being 180° to 183° C. This treatment was effective to convert the bulk of the succinic acid present in the ion-exchanged acid mixture into succinic anhydride. Further distillation without rectification can be used to remove the succinic acid and succinic anhydride remaining in the distilland as an overhead distillate fraction with the high boiling water-entraining agent.

After the succinic anhydride is substantially completely removed as a distillate from the foregoing dehydrated distilland by codistillation with the water-entraining agent, cooling the remaining distilland to about 70° F. will precipitate a crude solid $C_{5+}$ dibasic acid fraction. Lixiviating this fraction with four parts of liquid sulfur dioxide per part of the solid fraction, then dissolving the SO$_2$-insoluble residue in water, filtering, and finally evaporating off the water will give a free-flowing, white, crystalline C$_{5+}$ dibasic acid product.

*Example 3.*—A sample of the same mixture of crude ion-exchanged stripped acid residue used in Example 1 was used in the following operation. A mixture of 50 grams of these crude mixed acids and 75 ml. of a technical grade of diethylbenzene (a meta and para mixture having boiling range of 175° to 181° C.) was made up and distilled at atmospheric pressure in the same apparatus as used in Example 1. The distillate was cooled to about 50° F., filtered from solids, separated from discrete water present, and recycled to the distilland at approximately the same rate as fluid being taken off the distilland by the distillation.

The total weight of separated solids collected from the distillate was 13.8 grams; these solids were a mixture of succinic acid and succinic anhydride equivalent to about 14.9 grams of succinic acid. This represents about 91% of the succinic acid originally present in the sample of dibasic acids subjected to the distillation treatment.

After cooling the dark-colored distillation residue to room temperature, the solvent was decanted from a dark, somewhat oily residue. This residue was extracted three times with 101-gram portions of refluxing sulfur dioxide at about −10° C. The SO$_2$-insoluble material was a brownish powder. This powder was dissolved in water, filtered of a small amount of black solids, and evaporated to dryness to leave free-flowing, white, crystalline solids having a neut. No. of 727 and analyzing: no succinic acid or succinic anhydride; 16% glutaric acid; 49% adipic acid; 5.5% pimelic acid; 12% suberic and higher acids; 17.5% unidentified acids.

While in the foregoing examples the SO$_2$ lixiviation of the C$_{5+}$ crude residuum was done at atmospheric pressure, it is to be understood that superatmospheric pressure can be used to accommodate operation with liquid SO$_2$ as high as about plus 200° F., and furthermore that the SO$_2$ lixiviation can be conducted at a temperature as low as minus 50° F. or lower, the atmospheric pressure operation with refluxing SO$_2$ being preferred for efficiency and economy.

I claim:
1. A process for the separation of succinic acid from a mixture of succinic acid with at least one dibasic acid of the formula HOOC(CH$_2$)$_n$COOH where *n* is an integer having a value of at least 3 which comprises: forming a distilland of said mixture and an inert hydrophobic organic solvent, said solvent having an atmospheric boiling point of between 175 and 220° C. and being capable of dissolving at least about 5 grams of succinyl material selected from the group consisting of succinic acid and succinic anhydride and mixtures thereof per 100 grams of the solvent at a temperature of 175–220° C., substantially exhausting said distilland of succinic acid by heating said distilland to a temperature of between 175 and 220° C., condensing the resulting vapor to form a condensate comprising succinic anhydride, succinic acid, water and solvent, cooling said condensate to a temperature between about 60 and 150° F., separating the resultant solid phase succinic anhydride and succinic acid from the condensed solvent and returning the condensed solvent to said distilland, subsequently crystallizing out and separating dibasic acids remaining in the distillation residue, then lixiviating the separated dibasic acids with liquid phase sulfur dioxide and thereafter separating the resultant lixivium from an insoluble purified dibasic acid fraction.

2. The process of claim 1 wherein the dibasic acid mixture for initial treatment is the product of oxidizing at least one paraffinic hydrocarbon, and the weight ratio of liquid sulfur dioxide to said separated dibasic acids used is between about 1:1 and 10:1.

3. The process of claim 1 wherein the solvent used is orthodichlorobenzene.

4. The process of claim 1 wherein solvent used is diethylbenzene.

References Cited in the file of this patent
UNITED STATES PATENTS

| | | |
|---|---|---|
| 1,424,138 | Bailey et al. | July 25, 1922 |
| 1,970,535 | James | Aug. 14, 1934 |
| 2,365,290 | Price et al. | Dec. 19, 1944 |
| 2,626,276 | Hibshman | Jan. 20, 1953 |
| 2,716,133 | Pooler | Aug. 23, 1955 |
| 2,724,717 | Hibshman | Nov. 22, 1955 |
| 2,729,600 | Beach | Jan. 3, 1956 |
| 2,794,831 | McKinnis | June 4, 1957 |

FOREIGN PATENTS

| | | |
|---|---|---|
| 524,440 | Canada | May 1, 1956 |

OTHER REFERENCES

Bouveault: Bull. soc. chim. Paris (3), 19, 562–565 (1898).

Noller: "Chemistry of Organic Compounds," 1951, pp. 731–734 and 63 to 64.